United States Patent [19]
Parker

[11] 3,854,084
[45] Dec. 10, 1974

[54] ELECTRONIC OBJECT COMPARATOR USING INDUCTIVE SENSORS AND FREQUENCY COMPARISON

[76] Inventor: Edward I. Parker, 34 Oak Ridge Rd., Holden, Mass. 01520

[22] Filed: May 14, 1973

[21] Appl. No.: 359,857

Related U.S. Application Data

[63] Continuation of Ser. No. 195,697, Nov. 4, 1971, abandoned.

[52] U.S. Cl. ............................................. 324/34 R
[51] Int. Cl. ........................................... G01r 33/12
[58] Field of Search ........................... 324/34 R, 40

[56] References Cited
UNITED STATES PATENTS

| | | | |
|---|---|---|---|
| 2,162,009 | 6/1939 | Goldsmith, Jr. | 324/34 R |
| 2,477,384 | 7/1949 | Mann et al. | 324/34 R |
| 2,581,394 | 1/1952 | Dinger | 324/34 |

FOREIGN PATENTS OR APPLICATIONS

| | | | |
|---|---|---|---|
| 578,207 | 6/1946 | Great Britain | 324/40 |
| 597,705 | 2/1948 | Great Britain | 324/34 R |

OTHER PUBLICATIONS

DuMont Laboratories; Dumont Cyclograph; Nov. 1943; pp. 1–7.

General Elec. Publ.; Magnetic Comparator; General Electric Review; Mar. 1944; pp. 57–58.

Salford; Magnetic Sorting Bridge; Jour. of Scien. Inst.; Nov. 1944; p. 201.

Stout, M.; Basic Elec. Meas.; New York; Prentic–Hall Inc.; Copyright 1950, pp. 466–469.

*Primary Examiner*—Robert J. Corcoran
*Attorney, Agent, or Firm*—Dike, Bronstein, Roberts, Cushman & Pfund

[57] ABSTRACT

An electronic comparator having two coils, each formed to receive one of two workpieces to be compared and connected through circuitry to the horizontal and vertical sweeps of a cathode ray oscilloscope.

1 Claim, 2 Drawing Figures

PATENTED DEC 10 1974　　　　　3,854,084

EDWARD I. PARKER
INVENTOR.

BY

Norman S. Blodgett

ATTORNEY

ELECTRONIC OBJECT COMPARATOR USING INDUCTIVE SENSORS AND FREQUENCY COMPARISON

This is a continuation of application Ser. No. 195,697 filed Nov. 4, 1971, and now abandoned.

BACKGROUND OF THE INVENTION

There are many situations in the manufacturing industries where it is necessary to compare a succession of finished workpieces with a master workpiece. Comparisons may be made for mass, size, configuration, structural defects, or nature of material. So far as configuration is concerned, it is common practice to use an optical comparator; in this case, an enlarged image of the workpiece being examined is projected onto a screen which carries an accurate enlarged drawing of the desired workpiece. The masses of objects have, since time immemorial, been compared by use of scales. The material characteristics of workpieces have sometimes been tested by use of magnetic measuring devices, but these have always been very complicated and expensive and require the use of skilled labor to use them accurately. Most methods of comparison have not only been very slow (as in the case of the optical comparator and the scales), but also have required alert, intelligent labor; persons using these methods have difficulty maintaining their accuracy through a long work day because of fatigue. These and other difficulties experienced with the prior art devices have been obviated in a novel manner by the present invention.

It is, therefore, an outstanding object of the invention to provide an electronic comparator which is simple to use for comparing the physical characteristics of successive workpieces by unskilled labor.

Another object of this invention is the provision of an electronic comparator making use of the magnetic properties of workpieces to compare them for mass, size, shape, and nature of material.

A further object of this invention is the provision of an electronic comparator which is simple in construction, which may be used by unskilled labor, and which is capable of a long life of useful service with a minimum of maintenance.

It is another object of the instant invention to provide an electronic comparator which makes use of the induction characteristics of a workpiece to compare accurately a succession of workpieces with a master workpiece whose physical characteristics are of a desired type.

A still further object of the invention is the provision of an electronic comparator in which a physical characteristic of a workpiece may be compared with a standard without the necessity of time-consuming location adjustment of the workpiece to be tested within the coil, the accurate location being brought about by the construction of the invention.

It is a further object of the invention to provide an electronic comparator for quickly comparing a physical characteristic of a workpiece with a similar characteristic of a master workpiece.

It is a still further object of the present invention to provide an electronic comparator made up of components the value of whose electrical characteristics need not be extremely high tolerance without affecting the accuracy of the comparator.

With these and other objects in view, as will be apparent to those skilled in the art, the invention resides in the combination of parts set forth in the specification and covered by the claims appended hereto.

SUMMARY OF THE INVENTION

In general, the invention consists of an electronic comparator having a first coil adapted to receive a standard workpiece and a second coil adapted to receive a workpiece to be compared with the standard workpiece. A first circuit is connected to the first coil and has an output lead carrying a signal indicative of the inductance in the first coil. A second circuit is connected to the second coil having an output lead carrying a signal indicative of the inductance of the second coil. An oscilloscope is provided to which both output leads are connected to show the relationship between the two inductances.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
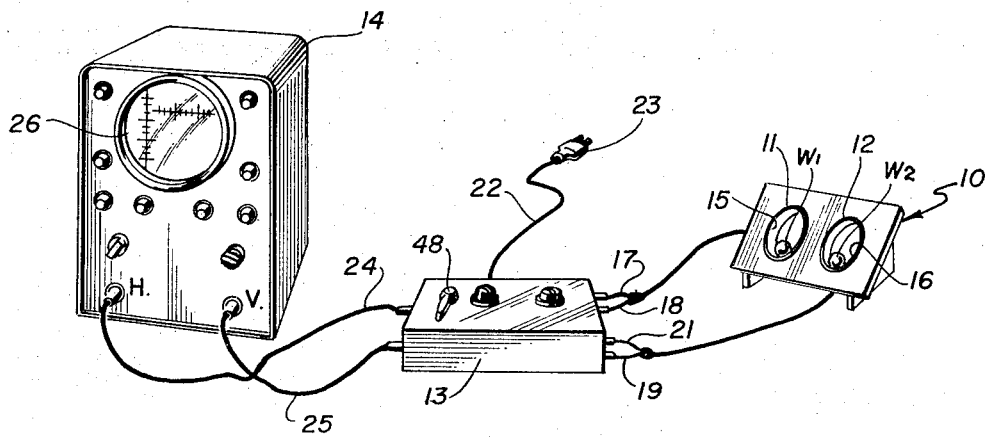
FIG. 1 is a perspective view of an electronic comparator embodying the principles of the present invention.

Referring first to FIG. 1, which best shows the general features of the invention, the electronic comparator, indicated generally by the reference numeral 10, is shown as consisting of two receptacles 11 and 12, a control box 13, and an oscilloscope 14. The receptacle 11 is formed with a cylindrical surface 15 whose axis is inclined to the horizontal and terminates in a flat bottom. The receptacle 12 is similarly provided with exactly the same size of cylindrical surface 16 and with a flat bottom. Embedded in the wall of the receptacle 11 is an electrical coil 11a which is connected to the control box 13 by leads 17 and 18. The receptacle 12 is similarly provided with an electrical coil 12a which is connected to the control box by leads 19 and 21. The coil 11a of the receptacle 11 is coaxial of the cylindrical surface 15, while the coil 12a associated with the receptacle 12 is concentric with the cylindrical surface 16.

The control box 13 is connected to a source of 110-volt AC electricity by a twin lead cable 22 having at its end a conventional plug 23. The control box 13 is also connected by two leads 24 and 25 to the horizontal and vertical inputs of the oscilloscope 14. The oscilloscope is provided with a face 26 on which electrical signals attached to the vertical and horizontal sweep inputs can be displayed at the same time.

Figure 2:
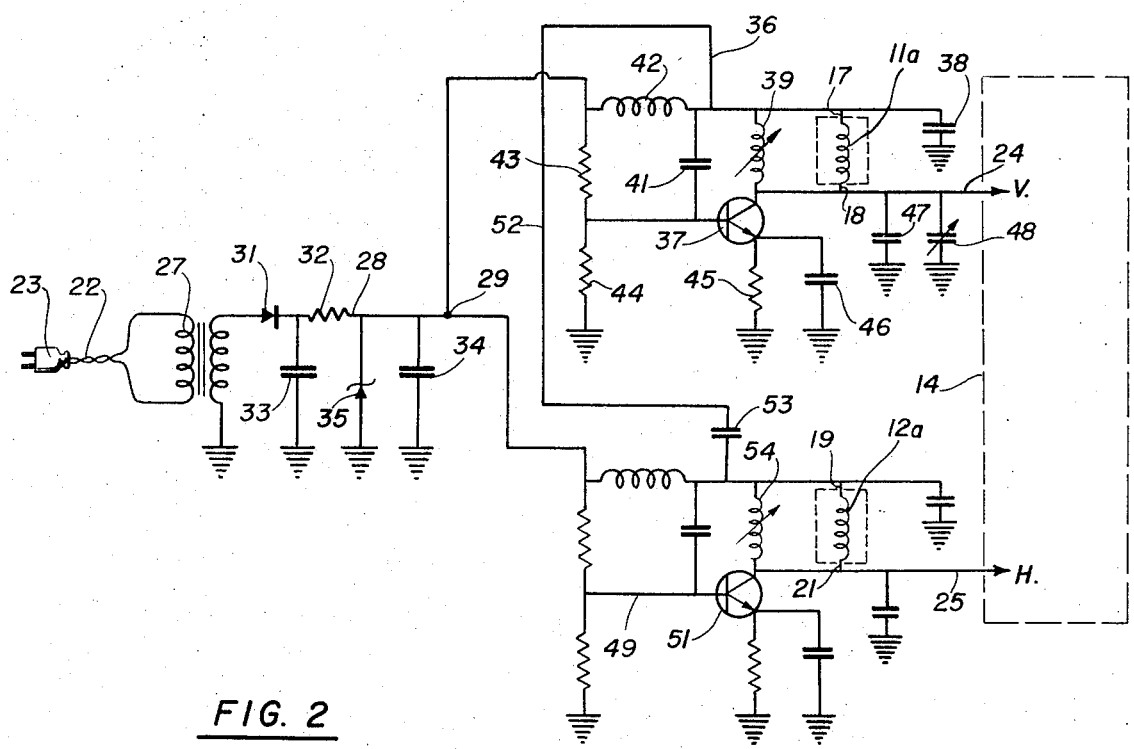
FIG. 2 is an electrical schematic diagram of the apparatus.

Referring now to FIG. 2, which best shows the electrical characteristics of the invention, it can be seen that the cable 22 leads the 110-volt AC electricity into a step-down transformer 27. The cable is actually connected to the primary coil of the transformer, while the secondary coil of the transformer is connected to a rectifier and a filter 28. This rectifier and filter takes 12-volt AC on the secondary of the transformer 27 and converts it to 9-volt DC at its output at a point 29. The rectifier element 31 feeds into a resistor 32 having a capacitor 33 leading from one side to ground and a capacitor 34 leading from the other side to ground. A Zenor diode 35 is also connected from the other side of the resistor 32 to ground to regulate the voltage. The point 29, the leads 17 and 18, and the lead 24 are all connected to a circuit 36 which includes a NPN transistor 37, the coil 11a lying in the collector circuit of the transistor. The output lead 24 is connected also to the collector of the transistor 37. One end of the coil 11a is connected to the collector of the transistor and the other end is connected through a capacitor 38 to ground. An adjustable coil 39 is connected across the coil 11a. The capacitor 41 is connected from the base of the transistor to the other side of the coil and the other side of the coil is connected to a choke coil 42 to the point 29 which is the source of direct current elecricity. The base of the transistor is connected through a resistor 43 to the point 29 and through another resistor 44 to ground.

The emitter of the transistor is connected through a resistor 45 to ground and by a capacitor 46 to ground. The lead 24 is connected to ground by a fixed capacitor 47 and by an adjustable capacitor 48. The coil 12a is associated with a similar circuit 49 including a NPN transistor 51 and an adjustable coil 54. The collector circuit of the two transistors 37 and 51 are connected by a line 52 which includes a capacitor 53.

The operation of the invention will now be readily understood in view of the above description. A master workpiece W1 is placed in the receptacle 11 in contact with the cylindrical surface 15 and a similar master workpiece W1 is placed in the receptacle 12. The electrical elements are balanced until a stationary pattern appears on the face 26 of the oscilloscope 14. Then, the master workpiece W1 is removed from the receptacle 12 and, subsequently, various workpieces W2 are placed in the receptacle 12 in contact with the cylindrical surface 16. When a workpiece W2 to be tested is placed in the receptacle 12, the pattern on the face 26 of the oscilloscope is a stationary pattern, if the workpiece is exactly like the master workpiece W1 which resides in the receptacle 11. In such a case, it is exactly similar in size, mass, shape, and nature of material. In this way, if it is necessary to test for mass, it is possible to do so. If shape of the article is the physical characteristic in question, the apparatus will test this also. In some cases, the tester is only interested in determining if the workpiece has been heat-tested or not, and a non-heat-treated article will have different material characteristics and will not give a stationary pattern when compared with a master workpiece W1 that has been heat-treated.

In a practical embodiment of the invention, the resistor 32 was 1,000 ohms, the capacitor 33 was 100 microfarads, the capacitor 34 was 100 microfarads, the resistor 43 was 15,000 ohms, and the resistor 44 was 10,000 ohms. The choke 42 was 82 milhenrys, the capacitor 41 was 6 microfarads, the adjustable coil 39 was adjustable from 1.5 to 10 milhenrys, and the capacitor 38 had 0.05 microfarads. The resistor 45 had 1,000 ohms, the capacitor 46 had 6.0 microfarads, the capacitor 47 had 0.01 microfarads, and the adjustable capacitor 48 had 100 picofarads. The adjustable coils 39 and 54 must be shielded. In the practical embodiment, the coils 11a and 12a each consisted of 750 turns of No. 26 magnetic wire. This would vary in accordance with the size of the receptacle, but is selected to give an inductance of about 8 milhenrys.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An electronic comparator, comprising
   a. a first coil having a predetermined inductance,
   b. a second coil adapted to receive a workpiece to be tested and having when said workpiece is received substantially the same predetermined inductance,
   c. a first circuit connected to the first coil, the first circuit having a first-point and delivering to an output lead a signal whose frequency and phase is indicative of the inductance of the first coil,
   d. a second circuit connected to the second coil, said second circuit being substantially the same as said first circuit and having a second point located at a point in said second circuit structurally corresponding to the first point in said first circuit and delivering to an output lead a signal whose frequency and phase is indicative of the inductance of the second coil,
   e. a means for comparing the frequencies at the output leads, the means being in a first indicating state when the frequencies are equal, and a second indicating state when the frequencies are not equal, and
   f. an electrical coupling between the first and the second points, the coupling containing a capacitor, and being non-grounded for signals of the frequencies delivered by the circuits.

* * * * *

UNITED STATES PATENT AND TRADEMARK OFFICE
CERTIFICATE OF CORRECTION

PATENT NO. : 3,854,084
DATED : December 10, 1974
INVENTOR(S) : Edward I. Parker

It is certified that error appears in the above-identified patent and that said Letters Patent are hereby corrected as shown below:

Column 3, line 47, "heat-tested" should be -- heat-treated --.

Signed and Sealed this

Thirteenth Day of July 1976

[SEAL]

Attest:

RUTH C. MASON
Attesting Officer

C. MARSHALL DANN
Commissioner of Patents and Trademarks